United States Patent [19]
Friesen

[11] 3,820,881

[45] June 28, 1974

[54] SINGLE SYSTEM SOUND CAMERA AND PROJECTOR FOR MOTION PICTURES

[76] Inventor: Dietrich P. Friesen, 2243 Lakeview Ave., Los Angeles, Calif. 90039

[22] Filed: July 30, 1973

[21] Appl. No.: 383,974

[52] U.S. Cl. .................. 352/5, 352/11, 352/29, 352/37
[51] Int. Cl. ........................................ G03b 31/02
[58] Field of Search ................ 352/5, 10, 11, 29, 37

[56] References Cited
UNITED STATES PATENTS

| | | | |
|---|---|---|---|
| 3,452,161 | 6/1969 | Hafler | 352/37 X |
| 3,502,397 | 3/1970 | Bühler | 352/5 |
| 3,666,356 | 5/1972 | Williams | 352/5 |

*Primary Examiner*—Richard M. Sheen
*Assistant Examiner*—Michael L. Gellner
*Attorney, Agent, or Firm*—Harris, Kern, Wallen & Tinsley

[57] ABSTRACT

A motion picture sound camera and projector for recording and playing back associated audio and visual inputs on the same strip of film. Motion picture film having first and second sound tracks recorded ahead and behind their associated picture frames. Splicing the film and coding it to coordinate the playback of the sound tracks in connection with the picture frames before and after the splice.

17 Claims, 8 Drawing Figures

DIRECT SOUND CUT PROJECTOR SOUND SWITCHING CIRCUITRY

DIRECT SOUND CUT PROJECTOR SWITCHING SUMMARY

↓ TIME

| SENSOR | LEFT CHANNEL | RIGHT CHANNEL |
|---|---|---|
| BEHIND PICTURE<br><br>SW-1 | OFF | ON (MONO) |
| PICTURE GATE<br><br>SW-2 | ON (MONO) | OFF |
| AHEAD OF PICTURE<br><br>SW-3 | ON (STEREO) | ON |

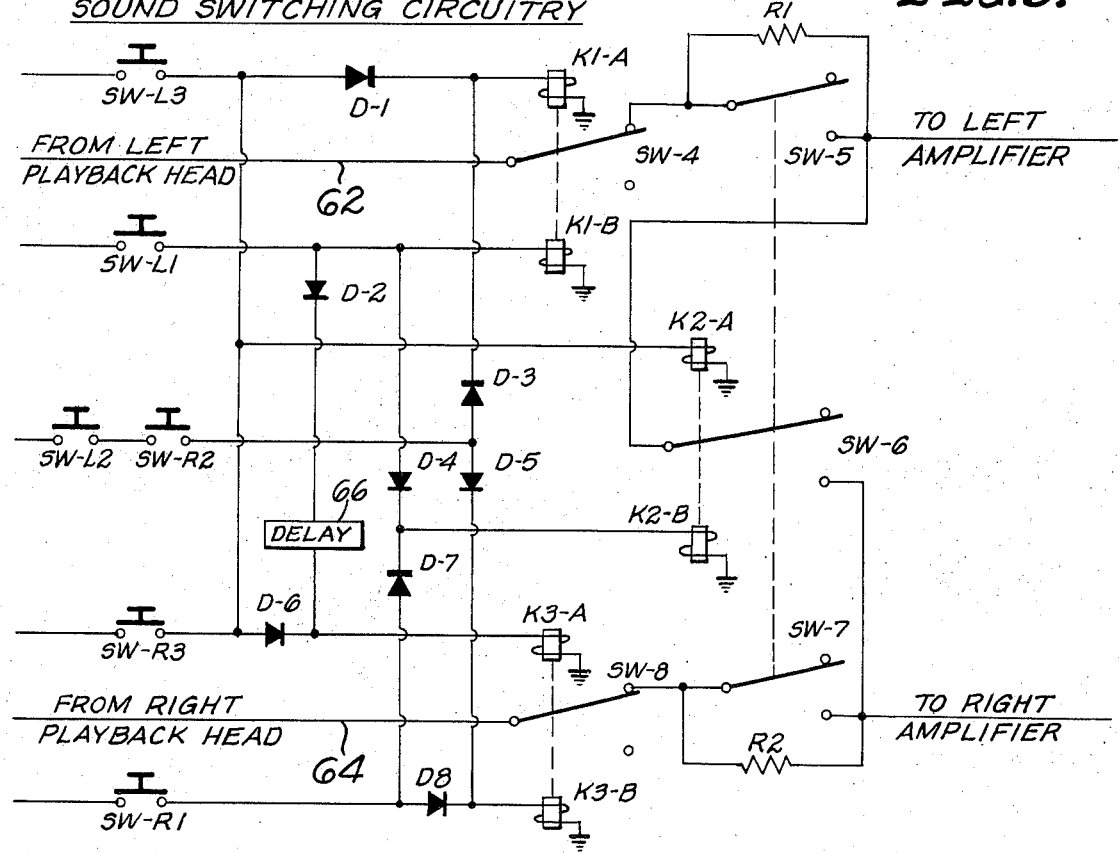

Fig. 5. OPTIONAL SOUND CUT PROJECTOR SOUND SWITCHING CIRCUITRY

Fig. 6. OPTIONAL SOUND CUT PROJECTOR SWITCHING SUMMARY

| SENSOR | MODE OF CUT | LEFT CHANNEL | RIGHT CHANNEL |
|---|---|---|---|
| BEHIND PICTURE LEFT SW-L1 RIGHT SW-R1 | DIRECT * | OFF | ON (MONO) |
| | BEHIND ** | OFF | ON (MONO) |
| | AHEAD + | ON (MONO) | OFF |
| | MIXED ++ | ON | ON (IN SYNC) |
| PICTURE GATE LEFT SW-L2 RIGHT SW-R2 | DIRECT | ON (MONO) | OFF |
| | BEHIND | NO CHANGE | |
| | AHEAD | NO CHANGE | |
| | MIXED | ON (IN SYNC) | ON |
| AHEAD OF PICTURE LEFT SW-L3 RIGHT SW-R3 | DIRECT | ON (STEREO) | ON |
| | BEHIND | ON | ON (STEREO) |
| | AHEAD | ON (STEREO) | ON |
| | MIXED | ON | ON (IN SYNC) |

TIME ↓

* DIRECT SYNC CUT - BOTH TRACKS CUED
** SOUND BEHIND CUT - LEFT TRACK CUED
+ SOUND AHEAD CUT - RIGHT TRACK CUED
++ MIXED SOUND CUT - NEITHER TRACK CUED

Fig. 8.

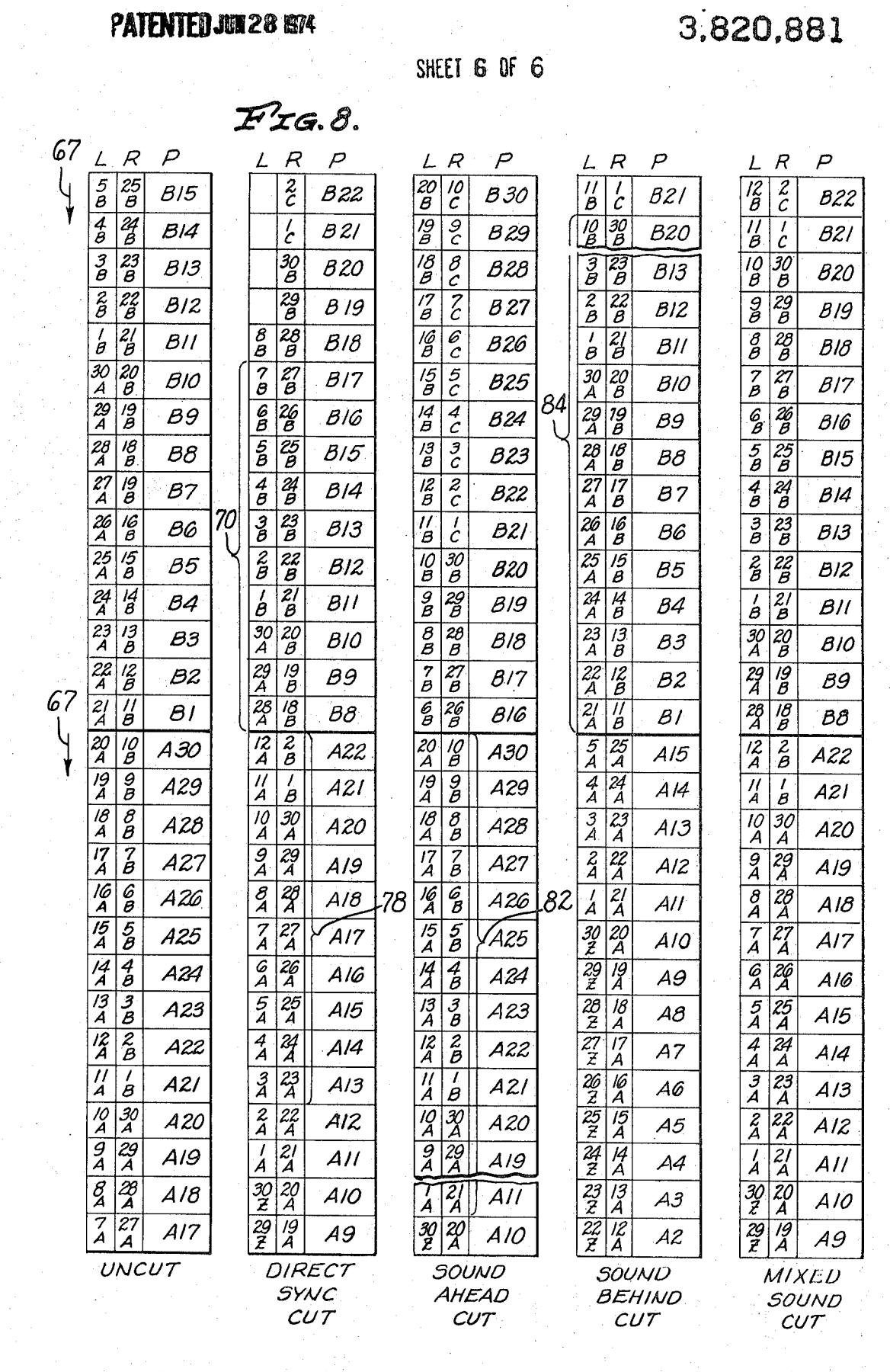

Fig. 8 shows five columns of film frame tables labeled UNCUT, DIRECT SYNC CUT, SOUND AHEAD CUT, SOUND BEHIND CUT, and MIXED SOUND CUT, each with L, R, P sub-columns listing frame identifiers.

SINGLE SYSTEM SOUND CAMERA AND PROJECTOR FOR MOTION PICTURES

This invention relates generally to the field of motion pictures, and more specifically to a system for recording a sequence of motion picture frames and their associated audio inputs on a single strip of film so that the sound and picture portions on the film can both be easily edited by the same cutting and splicing without losing any of the sound track needed for the picture frames before and after the splice.

Prior art motion picture systems in which the sound track is recorded on the same strip of film as the picture frames have been very difficult to edit, because such systems usually incorporate a single sound track recorded ahead of its related picture frames. Thus, any editing of the picture portion by lateral cutting to remove certain undesirable frames eliminated the wrong portion of the sound track not associated with such frames.

It is therefore an object of the present invention to overcome the aforementioned problems and provide a sound motion picture system which allows the simultaneous editing of both sound and picture with the same lateral cutting and splicing without any loss of synchronization between the remaining picture frames and their associated sound inputs on the sound track.

The more specific object of the invention is to provide a stereophonic motion picture system wherein a first sound track is recorded a predetermined distance behind its associated picture frames and a second sound track is recorded a predetermined distance ahead of the same associated picture frames. A related object is to provide a sound system having the foregoing characteristics in which the two sound tracks on the head and tail of two pieces of film spliced together can be coordinated for the desired playback with the picture frames before and after the splice.

Another specific object is to provide a motion picture sound system having the aforementioned characteristics in which the spliced film can be coded to actuate a switching circuit in the projector so that different combinations of coordination can be achieved between the sound track and picture frames on both sides of a splice. A related object is to provide such a system wherein the picture frames before and after a splice can be directly synchronized with their associated audio inputs on one or both of the sound tracks, or where the audio portion associated with a scene behind the splice is heard ahead of time before the scene ahead of the splice ends, or the audio portion associated with a scene ahead of the splice is delayed to carry over into the scene commencing behind the splice, or wherein the audio portion of two scenes adjacent a splice are mixed together as the scene ahead of the splice ends and the scene behind the splice commences.

Another object is to provide a complete system of a camera, film, and projector incorporating the aforementioned features which will work together as a single audio-visual system which is simple, accurate, and inexpensive and can be used by professional photographers as well as amateurs.

Further objects, features, and advantages of the invention will be evident to those skilled in the art from the following description of the various embodiments and alternative forms of the invention.

In the drawings:

FIG. 5 shows an alternate switching circuit for use with the projector of FIG. 2 to provide four modes of coordination of the picture frames on both sides of a splice with one or the other of two sound tracks;

FIG. 6 is a tabular summary of the operation of the switching circuit of FIG. 5;

FIG. 8 is an exemplary diagram showing the relative positioning of motion picture frames and their associated audio inputs after various types of splicing.

In general, the invention provides a method for simultaneously recording on the same strip of film visual inputs on a sequence of picture frames and associated audio inputs on two sound tracks, a first sound track such as the left channel being recorded a predetermined distance behind its picture and a second sound track such as a right channel being recorded a predetermined distance ahead of its picture. When it is necessary to edit the film by changing the order of the scenes or eliminating certain portions of a scene altogether, it is possible to edit both the audio and visual portions at the same time by laterally cutting and splicing the film and coding the spliced film with the proper indicia to cue one sound track and/or the other as the splice passes through the projector.

Figure 1:
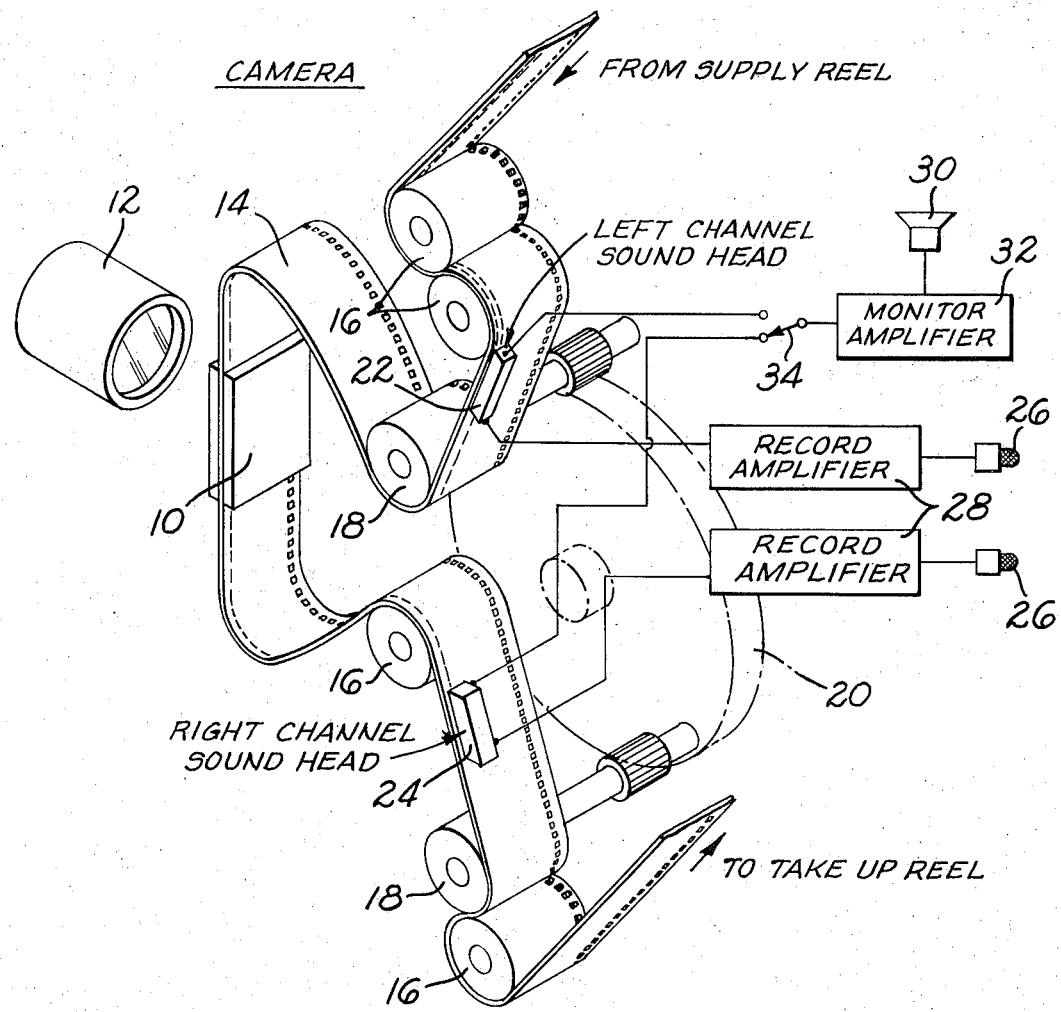
FIG. 1 shows a partially diagrammatic view of a presently preferred embodiment of a sound motion picture camera incorporating the invention.
Figure 2:
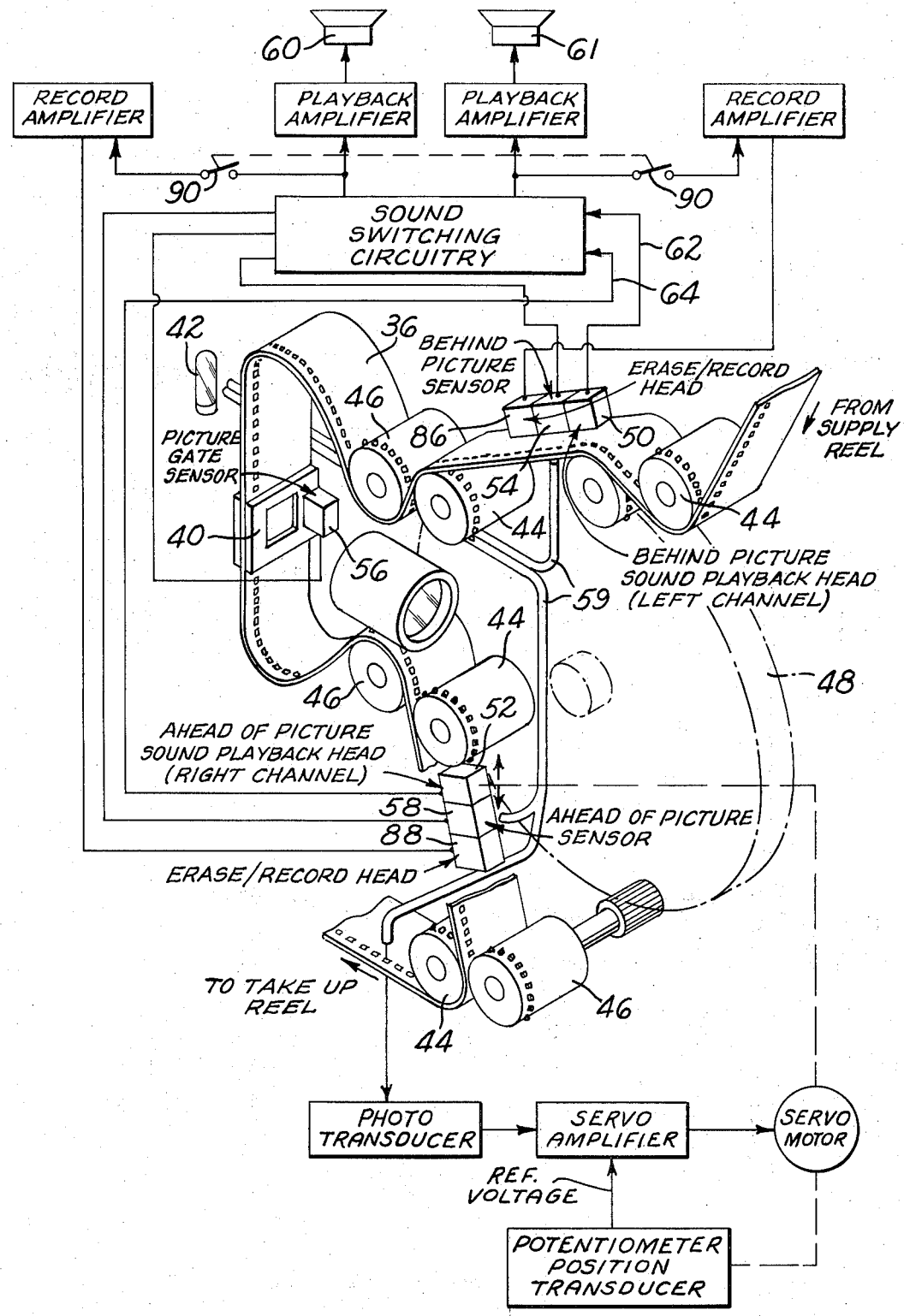
FIG. 2 shows a partially diagrammatic view of a presently preferred embodiment of a sound motion picture projector incorporating the invention.

An exemplary camera and projector suitable for practicing this method are illustrated in the embodiment shown in FIGS. 1 and 2. The camera includes an exposure gate 10 optically aligned with a lens 12. The single strip of unexposed film 14 passes from a supply reel (not shown) along a predetermined path through conventional positioning rollers 16 and two drive rollers 18 on both sides of the exposure gate 10, with both drive rollers preferably driven by a common drive wheel 20 to regulate the recording time fluctuations of one channel relative to the other. A first sound head 22 is positioned along the path a predetermined distance behind the exposure gate and a second sound head 24 is positioned a predetermined distance ahead of the exposure gate. Each of the sound heads 20, 22 receives an audio input associated with the picture being exposed through the lens 12 on to the film passing through the exposure gate 10. Although a single microphone (monaural) may be used to provide the same input to each of the sound heads, it is preferable to employ a stereophonic system having separate microphones 26 connected through amplifiers 28 to each of the sound heads 22, 24. An earphone monitor 30 may be connected through an amplifier 32 and a selector switch 34 to one or the other of the sound heads 22, 24 or otherwise coupled to the audio inputs coming from the microphones 24 when the switch is moved from an open "off" position to one of the two closed "on" positions.

In the exemplary embodiment of FIG. 1, the sound tracks are shown being recorded on the base side of the film, as would be the case with a magnetic sound striped film. Of course, the invention is applicable to any other form of sound track, such as an optical sound track which would be recorded on the emulsion side of film and played back from either side of the film, such as shown in FIG. 2.

A projector typically includes components corresponding to those of the camera. More specifically, as shown in FIG. 2, developed film 36 passes along a predetermined path through a projection gate 40 optically aligned with a directed light source 42, with conventional rollers 44 positioned at pertinent points along the path, and drive rollers 46 synchronized by a common drive wheel 48. A first sound playback head 50 is positioned behind the projection gate 40 the same distance as the predetermined distance between the exposure gate 10 and the first sound head 22 of the camera, and a second sound playback head 52 is positioned ahead of the projection gate the same distance as the predetermined distance between the exposure gate 10 and the second sound head 24 of the camera. These two predetermined distances are the same in the illustrated embodiment to simplify the various splicing methods of the invention. However, the invention is also applicable to a "sound ahead" distance which is different from a "sound behind" distance.

Positioned along the project path for the developed film 36 is a first sensor 54 to detect the passage of a splice by the first sound playback head 50, a picture gate sensor 56 to detect the passage of a splice by the projection gate 40, and a second sensor 58 to detect the passage of a splice by the second sound playback head 52. Where the sensors are actuated optically, fiber optics 59 can be used to connect the directed light source 42 with those sensors which are remote from the projection gate.

Various types of sensors can be employed to detect either the splice itself or alternatively to detect indicia applied on the film at or near the splice. Thus, the invention is applicable for film spliced by all splicing techniques such as wet, butt, mylar, tape, wedge, V-splice and the like. Where magnetic strip sound film is used, holes punched in the sound track area may be used as indicia. Where an optical sound track film is used, the indicia may constitute metal tabs, metallic paint or the like. If the indicia which actuate the sensors are located at the splice itself, as shown in the illustrated form, the three sensors 54, 56, 58 are positioned adjacent their reference elements 50, 40, 52, respectively. Of course, indicia displaced a certain number of frames from the splice would be used in conjunction with sensors displaced a corresponding distance from their respective reference elements.

Figures 3, 4:
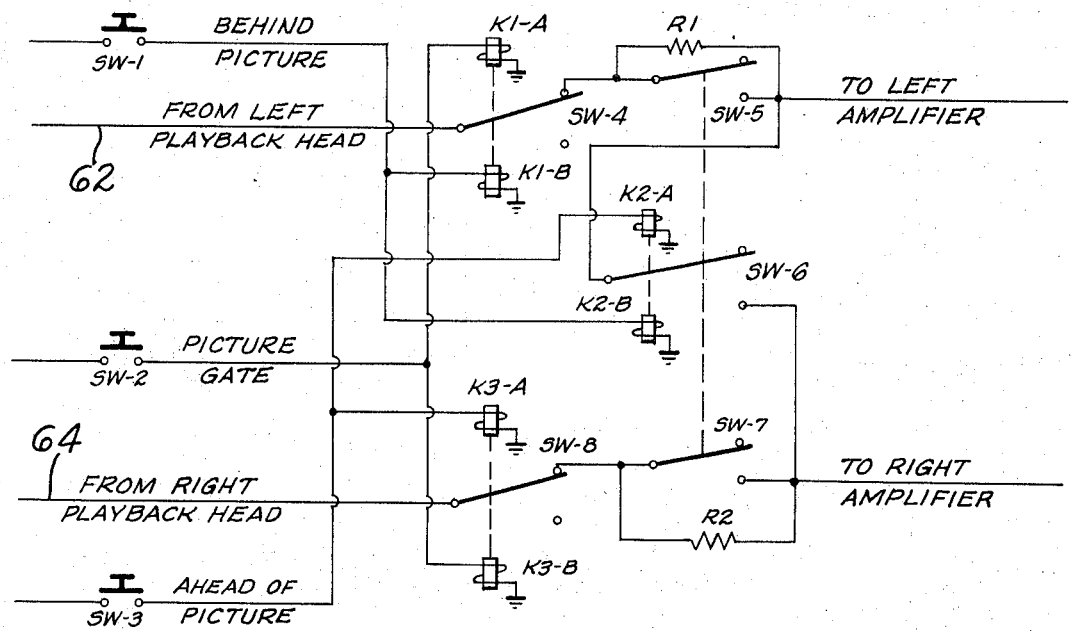
FIG. 3 shows an exemplary switching circuit for use with the projector of FIG. 2 to synchronize the picture frames on both sides of a splice with one or the other of two sound tracks.
FIG. 4 is a tabular summary of the operation of the switching circuit of FIG. 3.

In the simplest form of projector which is designed to play back sound only in direct synchronization with its associated picture frames, with both sound and picture changing at the picture cut, the switching circuitry of FIG. 3 may be coupled in series between the sound playback heads 50, 52 and their corresponding output speakers 60, 61 to bring about such synchronization.

More specifically, lines 62, 64 respectively connect their respective sound playback heads 50, 52 with the switching circuitry.

In the normal playback position, the signal from the left playback head 50 is transmitted through normally closed switch SW-4 to its amplifier, while the signal from the right playback head 52 is transmitted through normally closed switch SW-8 to its amplifier. Both signals are opposed by Resistors R-1 and R-2 to control amplifier input equalization during switching. Switches SW-1, SW-2 and SW-3 are momentary and normally open, and represent or are coupled to the three sensors 52, 54, 56 respectively. The relays K1, K2 and K3 are latching relays, with relay K1 operating switch SW-4, and relay K3 operating switch SW-8. Relay K2 operates switch SW-5, SW-6 and SW-7 which are interlocked and normally open, with switches SW-5 and SW-7 in series respectively with switches SW-4 and SW-8, and switch SW-6 connecting together the input lines to the amplifiers for both speakers 60, 61.

Switch SW-1 is connected to relay K1 to open switch SW-4 and to relay K2 to close switch SW-6. Switch SW-2 is connected to relay K1 to close switch SW-4 and to relay K3 to open switch SW-8. Switch SW-3 is connected to relay K2 to open switch SW-6 and to relay K3 to close switch SW-8.

When a splice crosses the behind picture sensor 54, switch SW-1 closes and triggers relay coils K1-B and K2-B to open switch SW-4 and close switches SW-6 and SW-7. This turns off the left channel from playback head 50 and causes the right channel signal from playback head 52 to go to both the left and right amplifiers. This switching also bypasses resistors R-1 and R-2 equalizing the amplifier imputs. The same splice then crosses the picture gate sensor 56 closing switch SW-2 and triggering relay coils K1-A and K3-B to close switch SW-4 and open switch SW-8. This turns off the right channel and causes the left channel signal to now go to both the left and right amplifiers. Resistors R-1 and R-2 remain bypassed. The same splice then crosses the ahead of picture sensor 58, closing switch SW-3 and triggering relay coils K2-A and K3-A, to turn on the right channel, thereby returning the circuit to the normal playback position.

In an alternate form of the projector, the three sensors 50, 52, and 54 each include a pair of sensors for sensing coded indicia, which in the exemplary form are each associated with one or the other of the sound tracks, respectively. This provides a so-called optional sound-cut projector which enables spliced film to be cued for different combinations of audio/visual coordination before and after a splice, such as the four exemplary modes of FIG. 6 which result from the circuitry of FIG. 5. Switches SW-L1, SW-L2 and SW-L3 are momentary and normally open and represent or are coupled to the portion of the three sensors 54, 56, 58 respectively, which are all associated with the left channel, and switches SW-R1, SW-R2 and SW-R3 are the equivalent switches for the right channel. Thus, depending on the coded indicia or markings on the spliced film, sensor 54 actuates SW-L1 and/or SW-R1, sensor 56 actuates SW-L2 and/or SW-R2, and sensor 58 actuates SW-L3 and/or SW-R3.

The switching circuitry of FIG. 5 is somewhat similar to that of FIG. 3, except that the latching relays K1, K2 and K3 are actuated by different inputs. Thus, switch SW-L3 is connected to relay K1 to close switch SW-4, and to relay K2 to open switch SW-6, and to relay K3 to close switch SW-8. Switch SW-L1 is connected to relay K1 to open switch SW-4, to relay K2 to close switch SW-6, and to relay K3 to close switch SW-8. Switches SW-L2 and SW-R2 are connected in series to relay K1 to close switch SW-4, and to relay K3 to open switch SW-8. Switch SW-R3 is connected to relay K1 to close switch SW-4, and to relay K2 to open switch SW-6, and to relay K3 to close switch SW-8. Switch SW-R1 is connected to relay K2 to close switch SW-6, and to relay K3 to open switch SW-8. The diodes D-1 through D-8 are used to route the control signals properly, and in certain instances, the operation of one of the coils K3-A of relay K3 is delayed as exemplified by component 66.

The aforementioned switching, circuitry and components as specifically shown in FIGS. 3 and 5 are by way of example only, and constitute only one of many ways for automatically performing the various switching logic steps of the invention in a predetermined sequence. Of course, the invention contemplates the use of more sophisticated and/or more elementary components and combinations thereof to accomplish the desired coordination between the projection of visual inputs and the playback of audio inputs recorded on both sides of a splice.

In the Direct Sync Cut, both channels are cued so that the sound and picture remain in synchronication. When a splice cued in both channels crosses the behind picture sensor 54, it closes switches SW-L1 and SW-R1 and triggers relay coils K1-b, K2-B, K3-A and K3-B to open switch SW-4 and close switches SW-6 and SW-7. This turns off the left channel and causes the right channel signal to go to both the left and right amplifiers. Note that switch SW-8 remains closed, in effect, due to the delayed triggering of relay coil K3-A. This switching also bypasses resistor R-1 and R-2, equalizing the amplifier inputs. Diode D-6 prevents the triggering of relay coils K1-A and K2-A. The same splice then crosses the picture gate sensor 56, closing switches SW-L2 and SW-R2 and triggering relay coils K1-A and K3-B to close switch SW-4 and open switch SW-8. This turns off the right channel and causes the left channel signal to now go to both the left and right amplifiers. Resistors R-1 and R-2 remain bypassed. Diodes D-1 and D-8 prevent the triggering of other relay coils. The same splice then crosses the ahead of picture sensor 58, closing switches SW-L3 and SW-R3 and triggering relay coils K2-A and K3-A. This opens switches SW-5 and SW-6, and closes switch SW-8, which turns on the right channel, returning the circuit to the normal playback position. The triggering of relay coil K1-A has no effect since switch SW-4 was closed by the previous closing of switches SW-L2 and SW-R2. Diodes D-2 and D-3 prevent the triggering of other relay coils.

In the Sound Behind Cut, the left channel is cued so that the sound of the preceding shot or scene is heard over the following shot or scene for a moment after the picture cut. When a splice cued in the left channel crosses the behind picture sensor 54, it closes switch SW-L1 and triggers relay coils K1-B and K2-B to open switch SW-4 and close switches SW-6 and SW-7. This turns off the left channel and causes the right channel signal to go to both the left and right amplifiers. The triggering of relay coik K3-A has no effect since switch SW-8 is normally closed. The switching also bypasses resistors R-1 and R-2 equalizing the amplifier inputs. Diodes D-6 and D-7 prevent the triggering of other relay coils. The same splice then crosses the picture gate sensor 56, closing switch SW-L2. Since only switch SW-L2 is closed, the circuit switching is not changed from the previous switching condition. The same splice then crosses the ahead of picture sensor 58, closing switch SW-L3 and triggering relay coils K2-A and K1-A. This opens switches SW-6 and SW-7, and closes switch SW-4, which turns on the left channel, returning the circuit to the normal playback position. The triggering of relay coil K3-A has no effect since switch SW-8 is normally closed. Diodes D-2 and D-3 prevent the triggering of other relay coils.

In the Sound Ahead Cut the right channel is cued so that the sound of the following shot or scene is heard for a moment before the picture cut is seen. When a splice cued in the right channel crosses the behind picture sensor 54, it closes switch SW-R1 and triggers relay coils K3-B and K2-B to open switch SW-8 and close switches SW-5 and SW-6. This turns off the right channel and causes the left channel signal to go to both the left and right amplifiers. This switching also bypasses resistors R-1 and R-2 equalizing the amplifier inputs. Diodes D-4 and D-5 prevent the triggering of other relay coils. The same splice then crosses the picture gate sensor 56, closing switch SW-R2. Since only switch SW-R2 is closed, the circuit switching is not changed from the previous condition. The splice then crosses the ahead of picture sensor 58, closing switch SW-R3 and triggering relay coils K2-A and K3-A. This opens switches SW-5 and SW-6, and closes switch SW-8, which turns on the right channel returning to the circuit to the normal playback position. The triggering of relay coil K1-A has no effect since switch SW-4 is normally closed. Diodes D-2 and D-3 prevent the triggering of other relay coils.

In the mixed Sound Cut neither channel is cued so that the sound of the preceding and following shots or scenes are both played back mixing the sound for a short period of time before and after the picture cut. Since neither channel is cued at the splice, the circuit is not changed from its normal playback position by any of the sensors.

If the picture continuity from shot to shot in the original is satisfactory, no cutting, splicing or cueing need be done. The change in sound and picture will behave as if the scene change were cued as a Direct Sync cut. When editing for either projector, the Direct Sync Cut is made directly, picture to picture, of the head and tail of the two scenes to be joined, and no observation of sound recording position is necessary.

If one of the three other exemplary sound cut options is desired, and if the "sound ahead" or "sound behind" is to come from a different scene, it will be necessary to observe the sound recording position and to cut the two scenes as follows, such as when editing for the optional sound cut projector. When the Sound Ahead Cut is entirely to the upcoming scene, at least as many frames as the displacement distance for playback head 50 are cut off the head of the second or trailing scene of the two scenes to be joined. When the Sound Behind Cut is entirely to the previous scene, at least as many frames as the displacement distance for playback head 52 are cut off the tail of the first or leading scene of the two scenes to be joined. When the Mixed Sound Cut is entirely between two adjacent scenes, the aforesaid number of frames are cut from both the tail and head portions of the film.

Of course, it will be appreciated that other modes of splicing and cueing are possible, in addition to the four exemplary modes described herein, in order to achieve different combinations of audio portions played back in coordination with the visual portions of picture frames on both sides of the splice.

Figure 7:
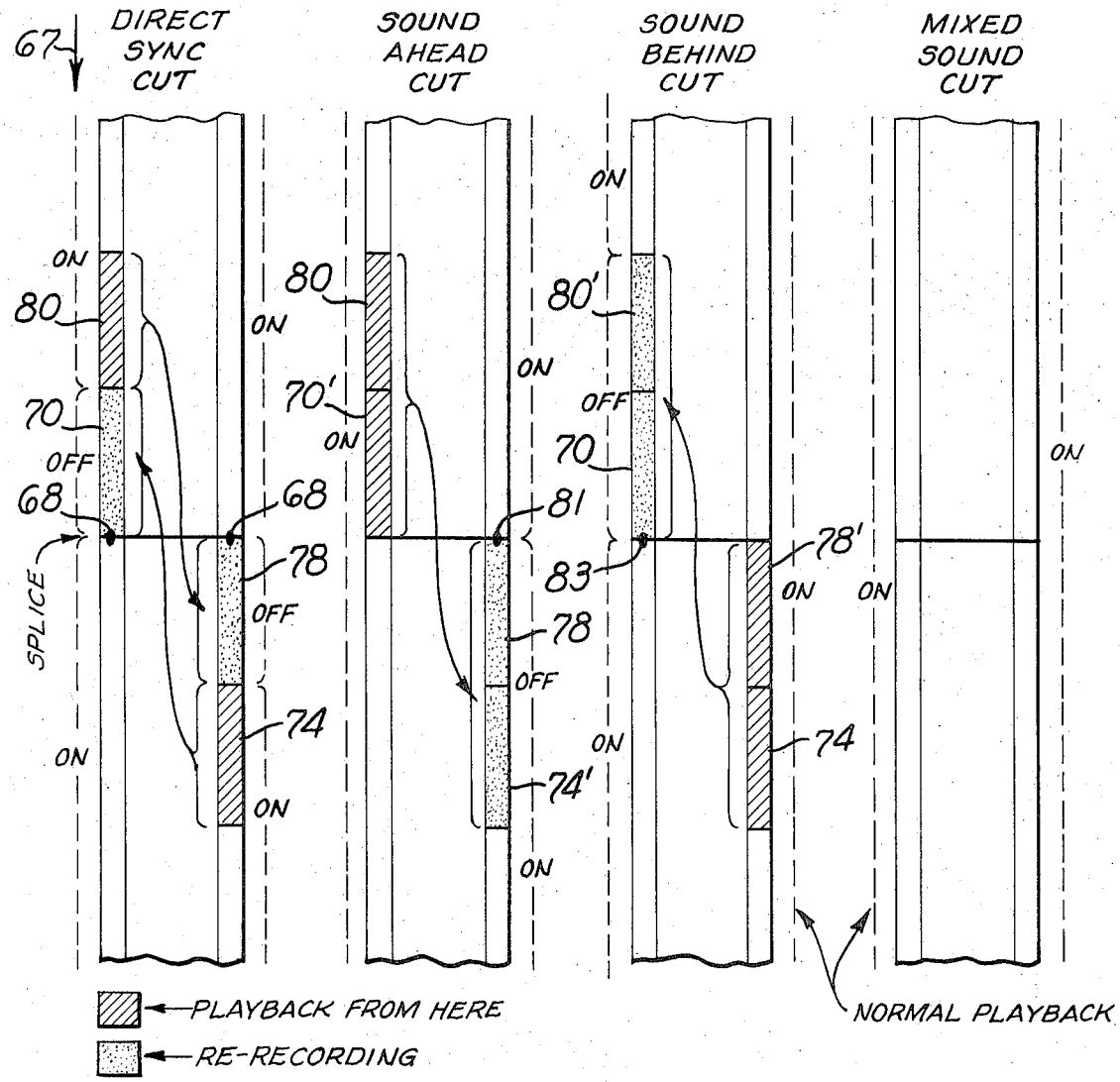
FIG. 7 is an exemplary diagram further illustrating the four modes of operation of the switching circuit of FIG. 5 as well as showing the manner of optional re-recording after splicing.

The manner of editing, splicing and cueing to achieve the four exemplary modes of audio/visual coordination is further shown in FIGS. 7 and 8 for strips of film which move in a forward direction 67. A Direct Sync Cut is the only mode available for the projector employing the switching circuitry of FIG. 3. When it is desired to use the Direct Sync Cut as one of the optional modes available for a projector employing the circuitry of FIG. 5, both channels are cued, as at 68. This causes the beginning portion 70 of the first sound track of the head portion of the splice to be turned off while the ending scene is identified by the letter "A" in FIG. 8 passes through the projection gate 40, thus allowing a portion 74 of the second sound track on the tail portion to provide the playback for both speakers 60, 61. However, when the coded indicia 68 is detected by the picture gate sensor 56, and the beginning of scene B commences, the terminating portion 78 of the second sound track on the tail portion of the splice is turned off while a portion 80 of the first sound track is played back on both speakers 60, 61.

In the Sound Ahead Cut, only the right channel is cued, as at 81. This causes the first sound track portion 70' on the head portion to be played back while the portion 74' of the second sound track on the tail portion is turned off, thereby allowing the sound on 70' which is normally associated with scene B to be heard ahead of time while scene A terminates. Thus, bracketed portion 82 of the tail portion constitutes the total portion of the right channel or second sound track which is turned off.

The opposite effect is achieved with the Sound Behind Cut by cueing only the left channel as at 83. This causes the terminating portion 78' of the second sound track on the tail portion of the splice to be played back at the same time the portion 80' of the first sound track on the head portion is turned off, thus enabling sound 78' normally associated with scene A to be delayed and heard during the beginning portions of scene B. Thus, in the Sound Behind Cut, bracketed portion 84 on the head of the splice constitutes the total part of the first sound track which is turned off.

In the mixed Sound Cut, neither channel is cued, causing the sound imputs normally associated with the starting and ending scenes adjacent the splice to be heard together both with the termination of scene A and the commencement of scene B.

The audio/visual system of the present invention enables film edited for the optional sound cuts of FIG. 6 to be re-recorded for use on either an optional sound cut projector or the direct cut sound projector employing only the circuitry of FIG. 3. During such re-recording, additional audio inputs can be added or "dubbed in" to the sound tracks. In this regard, a first erase/record head 86 is positioned along the film path, such as adjacent or immediately after the first playback head 50 and a second erase/record head 88 is similarly positioned relative to the second playback head 52. A print control, such as mechanically coupled switches 90 connects the erase/record heads with the respective audio outputs of the sound switching circuitry. Thus, as best shown in FIG. 7, it is possible to replace the undesirable portion of one sound track with the desired portion from another. These components can also be used to add additional audio inputs to the sound tracks which were not initially recorded by the camera unit.

In order to correlate the audio outputs from both sound tracks, apparatus is provided to control and position and thus adjust the timing of the playback of one of the sound playback heads relative to the other. This adjustment is necessary to compensate for the normal expansion and contraction of the film due to changes in himidity and temperature. This apparatus can be coupled to either of the playback heads, and reads the dimensions of the film by measuring the size of and the distances between the sprocket holes of the film with a photo transducer actuated by a light source such as the fiber optics 59. The voltage conducted by the photo transducer varies as the size of the film varies. The servo amplifier samples this voltage and compares it to the reference voltage from the potentiometer position transducer. When these two voltages are equal, the system is null-balanced and the servo motor does not move. However, when they are different, an error signal is produced in the servo amplifier. This error signal in turn drives the servo motor. As the servo motor turns, it repositions the playback head and changes the reference voltage in the potentiometer. The motor will continue to run until the photo transducer voltage equals the reference voltage in the potentiometer position transducer. The motor will then stop and the sound playback position will reflect the input voltage of the photo transducer.

Although an exemplary embodiment of some alternative forms of the invention have been disclosed and discussed, it will be understood that other applications of the invention are possible, and that the embodiments and forms disclosed may be subjected to various changes, modifications, and substitutions not necessarily departing from the spirit of the invention.

I claim as my invention:

1. A camera for simultaneously photographing pictures and recording sound on one strip of film which moves in a forward direction along a predetermined path through an exposure gate optically aligned with a lens, including:

first sound head means located on said path and displaced a first distance rearwardly from said exposure gate for recording a first sound track on the film behind its corresponding picture frames;

second sound head means located on said path and displaced a second distance forwardly from said exposure gate for recording a second sound track on the film ahead of its corresponding picture frames; and microphone means coupled to each of said first and second sound head means for transmitting an audio input to said sound heads.

2. The camera of claim 1 wherein said first and second sound head means are each displaced on said path the same distance from said exposure gate.

3. The camera of claim 1 wherein said microphone means includes separate microphones coupled to said first and second sound head means, respectively; and including:

a speaker;

monitor circuit means connected between said speaker and each of said separate microphones for monitoring their audio inputs; and switch means in said monitor circuit means for selectively connecting one of said microphones with said speaker.

4. A projector for simultaneously projecting pictures and playing back sound from one strip of film which moves in a forward direction along a predetermined path through a projection gate optically aligned between a light source and a lens, including:

first sound head means located on said path and displaced a first distance rearwardly from said exposure gate for playing back a first sound track which is on the film behind its corresponding picture frames;

second sound head means located on said path and displaced a second distance forwardly from said exposure gate for playing back a second sound track which is on the film ahead of its corresponding picture frames;

first sensor means located on said path for detecting a splice passing by said first sound head means;

second sensor means located on said path for detecting a splice passing through the projection gate;

third sensor means located on said path for detecting a splice passing by said second sound head means; and transmission means connected to each of said first and second sound head means for carrying the audio output from said two sound tracks, including switch means in series with each of said first and second sound head means and coupled with each of said first, second and third sensor means for coordinating the audio outputs from said two sound tracks carried by said transmission means with the corresponding picture frames passing through the projection gate.

5. The projector of claim 4 including first and second speakers connected through said transmission means to said first and second sound head means, respectively, and wherein said switch means includes means for connecting both of said speakers to only said second sound head means while a splice passes from said first sound head means to said projection gate and for connecting both of said speakers to only said first sound head means while a splice passes from said projection gate to said second sound head means.

6. The projector of claim 4 including first erase/record head means located on said path adjacent said first sound head means for replacing certain portions of said first sound track immediately following a splice with certain portions of said second sound track preceding the splice;

second erase/record head means located on said path adjacent said second sound head means for replacing certain portions of said second sound track immediately preceding a splice with certain portions of said first sound track following the splice; and auxiliary switch means connected between said first sound head means and said second erase/record head and between said second sound head means and said first erase/record head for selectively connecting the sound head means of one sound track with the erase/record head means of the other sound track.

7. The projector of claim 4 including means responsive to the environmental expansion and contraction of the film and coupled to at least one of said first or second sound head means for synchronizing the playback of said first and second sound tracks.

8. The projector of claim 4 wherein said first and second sound head means are each displaced on said path the same distance from said projection gate.

9. The projector of claim 4 wherein said first, second and third sensor means each include cue means for separately identifying first and second coded indicia on the film associated with said first and second sound tracks, respectively.

10. The projector of claim 4 wherein said first, second and third sensor means are positioned adjacent said first sound head means, said projection gate and said second sound head means, respectively.

11. A method of recording and editing audio/visual inputs recorded on the same strip of motion picture film, including the steps of:

recording the visual inputs on the film in a sequence of picture frames;

recording a first sound track on the film so that its audio inputs are recorded behind their associated picture frames;

recording a second sound track on the film so that its audio inputs are recorded ahead of their associated picture frames;

cutting the film laterally to provide a tail portion having terminal picture frames constituting its ending scene and a head portion having initial picture frames constituting its starting scene;

splicing the head portion adjacent to and behind the tail portion to obtain a desired sequence of picture frames different from the sequence obtained by said first mentioned recording step; and coding the film to play back selected portions of the audio inputs with the ending scene of the tail portion and the starting scene of the head portion.

12. The method of claim 11 wherein said coding step includes coding the film to prevent the terminal portion of the second sound track on the portion from being played back with the starting scene on the head portion and to prevent the initial portion of the first sound track on the head portion from being played back with the ending scene on the tail portion, while allowing both the playback of the second sound track on the tail portion with its associated ending scene and the playback of the first sound track on the head portion with its associated starting scene.

13. The method of claim 11 including recording the audio inputs of the first sound track a predetermined distance behind their associated picture frames;

wherein said cutting step includes removing the starting scene a sequence of initial frames having a combined length at least as great as the predetermined distance; and wherein said coding step includes coding the film to prevent the terminal portion of the second sound track on the tail portion from being played back with the starting scene on the head portion and to allow the initial portion of the first sound track on the head portion associated with the starting scene to be played back with the ending scene on the tail portion, while preventing the playback of the second sound track on the tail portion with its associated ending scene and allowing the playback of the first sound track on the head portion with its associated starting scene.

14. The method of claim 11 including recording the audio inputs of the second sound track a predetermined distance ahead of their associated picture frames;
   wherein said cutting step includes removing from the ending scene a sequence of initial frames having a combined length greater than the predetermined distance; and
   wherein said coding step includes coding the film to allow the terminal portion of the second sound track on the tail portion associated with the ending scene to be played back with the starting scene on the head portion and to prevent the initial portion of the first sound track on the head portion from being played back with the ending scene on the tail portion, while allowing the playback of the second sound track on the tail portion with its associated ending scene and preventing the playback of the first sound track on the head portion with its associated starting scene.

15. The method of claim 11 including recording the audio inputs of the first and second sound track in first and second predetermined distances, respectively, behind and ahead of their associated picture frames;
   wherein said cutting step includes removing from the starting scene a sequence of initial frames having a combined length at least as great as the first predetermined distance and removing from the ending scene a sequence of terminal frames having a combined length at least as great as the second predetermined distance; and
   wherein said coding step includes coding the film to allow the terminal portion of the second sound track on the tail portion to be played back with the starting scene on the head portion and the initial portion of the first sound track on the head portion to be played back with the ending scene on the tail portion, while also allowing both the playback of the second sound track on the tail portion and the playback of the first sound track on the head portion with their associated ending and starting scenes, respectively.

16. Motion picture film including visual inputs recorded on the film in a sequence of picture frames, a first sound track having audio inputs recorded on the film a first distance behind their associated picture frames, and a second sound track having audio inputs recorded on the film a second distance ahead of their associated picture frames.

17. The film of claim 16, including portions which have been spliced together, and further including indicia means on the film for coordinating the playback of the two sound tracks with the picture frames before and after the splice.

* * * * *

PO-1050
(5/69)

UNITED STATES PATENT OFFICE
CERTIFICATE OF CORRECTION

Patent No. 3,820,881　　　　　　　　　Dated June 28, 1974

Inventor(s) Dietrich P. Friesen

It is certified that error appears in the above-identified patent and that said Letters Patent are hereby corrected as shown below:

[56] References cited "Biihler" should be --Bühler--

Primary Examiner "Sheen" should be --Sheer--

[76] Inventor's correct address is: 205 Queen Mary Drive, Apt. 205, Oakville, Ontario, Canada Column 2, line 56, "20" should be --24--

Column 3, line 1, "24" should be --26--

Column 4, line 13, "52" should be --58--

Column 5, line 31, "K1-b" should be --KI-B--

Column 5, line 65, "coik" should be --coil--

Column 6, line 32, after "returning" delete "to"

Column 7, line 20, "is" should be --as--

Column 8, line 15, "himidity" should be --humidity--

Signed and sealed this 4th day of February 1975.

(SEAL)
Attest:

McCOY M. GIBSON JR.
Attesting Officer

C. MARSHALL DANN
Commissioner of Patents